(12) United States Patent
Skiles et al.

(10) Patent No.: US 7,998,244 B2
(45) Date of Patent: Aug. 16, 2011

(54) PROCESS OF TREATING METAL BEARING CRUSHED ROCK TO CONTROL RESPIRABLE DUST DURING TRANSPORT IN THE PROCESS INCLUDING A METAL CONCENTRATING CIRCUIT

(75) Inventors: Kevin D. Skiles, Troutville, PA (US); William E. Tis, Verona, PA (US)

(73) Assignee: Freedom Industries, Inc., Charleston, WV (US)

( * ) Notice: Subject to any disclaimer, the term of this patent is extended or adjusted under 35 U.S.C. 154(b) by 40 days.

(21) Appl. No.: 12/633,821

(22) Filed: Dec. 9, 2009

(65) Prior Publication Data

US 2010/0147111 A1    Jun. 17, 2010

Related U.S. Application Data

(60) Provisional application No. 61/122,795, filed on Dec. 16, 2008.

(51) Int. Cl.
*C22B 1/244* (2006.01)
(52) U.S. Cl. ........... 75/712; 75/722; 75/727; 75/961; 209/155; 209/156; 209/178
(58) Field of Classification Search .......... 209/155, 209/166, 178; 75/712, 722, 961, 727
See application file for complete search history.

(56) References Cited

U.S. PATENT DOCUMENTS

| | | | |
|---|---|---|---|
| 4,104,157 A * | 8/1978 | Fountain et al. | 209/166 |
| 4,384,890 A | 5/1983 | Clevenger et al. | |
| 4,594,132 A | 6/1986 | Satchell, Jr. et al. | |
| 6,409,022 B1 * | 6/2002 | Rothenberg et al. | 209/166 |
| 6,506,318 B1 | 1/2003 | Sapienza et al. | |
| 6,827,220 B1 * | 12/2004 | Young et al. | 209/166 |
| 6,972,107 B2 | 12/2005 | Marsden et al. | |
| 7,147,679 B2 | 12/2006 | Donovan et al. | |
| 7,341,700 B2 | 3/2008 | Marsden et al. | |
| 2005/0167340 A1 * | 8/2005 | Yoon | 209/166 |
| 2008/0149536 A1 * | 6/2008 | Ronkainen et al. | 209/163 |
| 2009/0301972 A1 * | 12/2009 | Hines et al. | 210/705 |

OTHER PUBLICATIONS

C.C. Furnas, Rogers' Industrial Chemistry a Manual for the Student and Manufacturer, Nov. 1942, pp. 914-930, vol. Two, Sixth Ed., D. Van Nostrand Company, Inc., NY, USA.
Warren L. McCabe and Julian C. Smith, Unit Operations of Chemical Engineering, 1956, pp. 382-384, McGraw-Hill Book Company, Inc., NY, USA.
Stephan Company, Material Safety Data Sheet, May 26, 2006, Version 11, pp. 1-5.

(Continued)

*Primary Examiner* — George Wyszomierski
*Assistant Examiner* — Tima M McGuthry Banks
(74) *Attorney, Agent, or Firm* — Eckert Seamans Cherin & Mellot, LLC; Daniel P. Cillo, Esquire

(57) ABSTRACT

A method of alleviating dust in the early stages of metal ore processing, such as copper ore, through mining the ore through concentration involves spraying and wetting crushed ore rock and ground particles and dust at least several of a series of locations with a dust suppressant containing major amounts of water plus minor amounts of an additive combination of glycerol and a selected non-ionic surfactant, and passing the wetted particles and dust to a metal concentrator where the additive combination does not interfere with metal concentration yield.

11 Claims, 3 Drawing Sheets

OTHER PUBLICATIONS

Arthur & Elizabeth Rose, The Condensed Chemical Dictionary, Sixth Edition, 1966, pp. 540-541, 1098, Reinhold Publishing Corporation, NY, USA.

The Random House College Dictionary, Revised Edition, 1975, p. 958, USA.

* cited by examiner

ETHYLENE OXIDE    PROPYLENE OXIDE

PROCESS OF TREATING METAL BEARING CRUSHED ROCK TO CONTROL RESPIRABLE DUST DURING TRANSPORT IN THE PROCESS INCLUDING A METAL CONCENTRATING CIRCUIT

CROSS REFERENCE TO RELATED APPLICATION

This application claims priority under 35 U.S.C. §119(e) to U.S. Provisional Patent Application Ser. No. 61/122,795, filed Dec. 16, 2008 entitled, A PROCESS OF TREATING METAL BEARING CRUSHED ROCK TO CONTROL RESPIRABLE DUST DURING TRANSPORT IN THE PROCESS INCLUDING A METAL CONCENTRATING CIRCUIT.

BACKGROUND OF THE INVENTION

1. Field of the Invention

This invention relates to control of fugitive respirable dust in a method of transporting and crushing rock such as metal ore by spraying such crushed rock with a specific dust control palliative to control dust, where the method preferably involves a flotation circuit to concentrate metal, and where the palliative does not harmfully interact with reagents used in the flotation circuit.

2. Description of the Prior Art

Copper, lead, zinc, nickel, antimony, cadmium, molybdenum, vanadium and mercury are metals principally extracted from sulfide minerals; molybdenum mostly in the U.S. and Mexico, copper mostly in the U.S., Chile, Canada, Africa and some other countries. These minerals generally occur in relatively narrow veins necessitating the removal of large quantities of waste rock during mining operations, where the metallic content of the rock is low, about 0.25 to 3.0 wt. %. In the U.S., copper mining sites are mostly in western states, such as Utah and Arizona, where water necessary to metal recovery is in short supply and is in a process of conservation.

In all instances copper and the like ore, after mining transport, dumping onto conveyor belts, and multiple crushing to reduce particle size, is then transferred to a concentration means, such as an impeller type flotation machine. In the floatation machine, a variety of additives have been used in the past, such as pine oil, cresylic acid or amyl alcohol frothing agents; potassium ethyl xanate, sodium diethyl dithiophosphate or oleic acid "collecting agents" which additives film the particle so they adhere to air bubbles. Optionally, lime, soda ash, copper sulfate or sodium cyanide inorganic chemicals have been added in the flotation machine to prevent or assist filming the particles of the valuable minerals, which are carried by bubbles into a froth layer which is skimmed off, as described in detail in *Rogers Industrial Chemistry* ("*RIC*"), Ed., C. C. Furnas, Sixth Edition 1942, D. Van Nostrand, pages 914-930. An outline of treatment of low grade sulfide copper ore, at that time, is shown on page 923 of RIC, as is an impeller type flotation machine on page 919. Other type flotation machines are shown in Unit Operations of *Chemical Engineering*, W. L. McCabe and J. C. Smith, McGraw Hill, 1956, pages 382-384 as well as on page 919 of RIC.

With particular reference to copper ore, the objective of copper mining is to recover pure copper by extracting the mineral from coarse copper bearing ore. Copper bearing ore is removed from open pit mines by drilling, blasting, excavating, and crushing low grade ore. The ore is taken, usually by haul truck to primary crushers then via overland belts to secondary crushers. Along the way, raw ore is sometimes sent to stack out areas where it can be stored and then reclaimed in order to balance the flow of material between the excavating group and the ore concentration group. After the crushing process, coarse ore can go to a heap leach for chemical recovery of pure copper and is referred to as "oxide" ore. Or the coarse ore can be further crushed, and the fine copper ore sent to a froth flotation process for concentrated copper recovery and is referred to and herein defined as "sulfide" ore.

Sulfide ore contains between 0.25% and 5.0% copper metal with the balance being unwanted rock. Average copper metal content in copper ore is around 0.6%. In concentrating froth flotation circuits, crushed sulfide ore is mixed with thiol based chemicals such as but not exclusively xanthates which are referred to as "collectors". Collectors coat the fine copper sulfide particles, known as chalcopyrite ($CuFeS_2$) with a hydrocarbon coating that makes the chalcopyrite hydrophobic, that is, having little or no affinity for water—hydrophobicity. Raising the pH of the solution above ph 9.0 assists in the coating process. In the same process equipment, a "frother" is introduced which is generally an alcohol based non-ionic surfactant. Air is also either dissolved or induced into the flotation cell. The frother in contact with the air produces a swarm of bubbles which rises to the top of the froth cell. As the fine bubbles rise they preferentially come into contact with the hydrophobic chalcopyrite relative to the surrounding dirt and rock particles. The chalcopyrite concentrates in the foam and is skimmed off the top of the froth cell where it is sent to other processes to improve concentration and purity. Typical copper metal content of the froth cell foam concentrate is 20% to 40%. One type prior art cell is shown in FIG. 1.

The choice of surfactant for the frother and the application of the frother are closely guarded secrets within the copper mining industry, because the size of the foam bubbles and the surface tension of the bubbles can have a significant effect on the amount of copper metal recovered and the purity of the concentrate both of which have a large impact on the ultimate copper metal yield and the profitability of the copper mine.

Mine owners are reluctant to apply any chemicals to the raw copper ore, particularly surfactants, because of the potential to interfere with the flotation circuit. Very importantly, it is known that unwanted surfactants on the raw ore can alter the surface tension of the foam in the flotation circuit and/or create larger non-productive bubbles that collapse prior to skimming or hold less copper metal in the bubble surface. They can also resolubilize a portion of the collector back into the water phase resulting in poor copper recovery.

After concentrating, the concentrates (about 20-30 wt. % Cu or the like as Cu Sulfides, Fe Sulfides, other Sulfides and Silicates) have in the past been roasted, to adjust the proper ratio of Cu to S before fusing, and then passed through a process such as a reverberatory furnace smelting processor, to provide 30-45 wt. % Cu or the like "matte", and a slag waste containing 0.2-0.5 wt. % Cu. Then a converter operation can be utilized to provide 98 wt. % Cu or the like, which is refined and cast into 99.5+ wt. % Cu or the like Anodes.

The process of mining, hauling, conveying, and crushing all ores, including copper bearing ore generates vast amounts of dust. The dust is unwanted by mine operators for the following reasons:

1. Dust particles that leave the transport process are no longer available for copper recovery therefore the cost of mining this fraction of the total has been lost.
2. Airborne dust particles contribute to air pollution and may result in the mine operator exceeding State and Federal air quality limits resulting in fines and a possible halt to production.

3. Airborne dust particles can be breathed in by mine workers, particularly in enclosed areas, which can lead to respiratory problems for workers as well as OSHA and/or MSHA fines to the mine operator.
4. Dust particles that escape conveyors and crushers in enclosed areas can accumulate in work areas causing an unsafe work area and contributing to higher maintenance and operating costs.

Historically, mine operators have used local, regular water as a dust control palliative because it was inexpensive, readily available, and provided partial relief from the problems listed above. Although water is capable of wetting large pieces of copper ore, 0.32 cm to 15.25 cm (1/8" to 6"), smaller particles, particularly below about 0.015 cm (100 mesh), are very difficult to wet with water and these are the very same particles that leave the process equipment and contribute to respirable dust. Because of the high surface tension of water and the low mass of dust particles, the dust particles are repelled. Adding excess water in order to wet these particles results in pockets of saturated ore that can stick to chutes and other conveying and processing equipment resulting in plugged equipment and unscheduled outages.

More recently, water reserves, particularly in the Western United States have become scarcer and consequently more expensive. Mine operators have discovered that adding excess water to control process dust is now expensive, causes operational and maintenance problems, is marginally effective, and may not even be possible in areas where water consumption is regulated.

There are many modern methods to produce copper from copper ore including, for example, cupric chloride leaching as taught by Clevenger et al. (U.S. Pat. No. 4,384,890); a chloride hydrometallurgical process taught by Satchell Jr. et al. (U.S. Pat. No. 4,594,132); a direct electrowinning process taught by Marsden et al. (U.S. Pat. No. 6,972,107); and medium temperature pressure leaching as taught by Marsden et al. (U.S. Pat. No. 7,341,700). However, little attention seems to have been paid to improving fins dust control while not aggravating process conditions downline.

In a completely different area, coal fines have been sprayed with a tall-oil-based emulsion to effect a chemical change in the coal, with the purpose to produce a synthetic fuel, as taught, for example, by Donovan and T is (U.S. Pat. No. 7,147,679).

There is a long felt need, over the last 70 years, for a way to conserve water in the above described mining processes. Even a 10% reduction would provide advantageous economics and potential compliance with potential future conservation efforts. Because of the negative impact to the sulfide ore flotation process discussed earlier, copper mine operators have been reluctant to use surfactants, and most anything except water, to assist in process dust control. As of 2008, no copper mine in the United States is known to commercially use surfactants for the purpose of process dust control.

Therefore, it is an object of this invention to provide a process to control dust particles during crushing and transporting rock, to reduce air pollution and protect workers.

It is a further object of this invention to provide a process during ore pre-processing that conserves water. It is a further object of this invention to spray dust particles during ore processing with a dust control palliative, which palliative will not provide harmful action on downstream flotation circuits or reduce metal production from the ore process.

SUMMARY OF THE INVENTION

The above needs are met and objectives satisfied by providing a method of controlling fugitive respirable dust in recovering metal values from a metal bearing sulfide material comprising the steps: (1) providing a stream of rock material comprising the metal bearing sulfide material; (2) crushing the rock material at least once, to provide particle and dust material; (3) conveying the particle and dust material to a metal sulfide ore concentrator, including at least one device, capable of separating metal values from the particle and dust material; wherein during at least one of steps (1), (2) or (3) the material is contacted with a surfactant based dust control palliative comprising a water mixture of glycerol and non-ionic surfactant, which surfactant enhances the wetting ability of the water to the particle and dust material, to provide a wetted particle and dust material having reduced hydrophobicity; and then (4) passing the wetted particle and dust material through a metal sulfide ore concentrator machine to provide concentrated metal values. The surfactant contains $C_8$ to $C_{14}$ carbon chain alcohols which have been ethoxylated and propoxylated Preferably, the separation device is a flotation machine.

The invention also provides a method of controlling respirable dust in recovering copper values from a metal bearing material comprising the steps (1) providing a stream of rock material comprising copper bearing material; (2) crushing the rock material at least once, to provide particle and dust material; (3) conveying the particle and dust material, in a conveying action having at least one point of free fall, to a copper sulfide ore concentrator, including at least one flotation machine, capable of separating copper values from the particle and dust material; wherein during at least one of steps (1), (2) or (3) the material is sprayed with a surfactant based dust control palliative comprising a water dispersion of glycerol and non-ionic surfactant containing $C_8$ to $C_{14}$ carbon chains with attached ethoxylated and propoxylated alcohols, which surfactant enhances the wetting ability of the water to the particle and dust material, to provide a wetted particle and dust material agglomerate; and then passing the agglomerate through a flotation machine to provide a copper concentrate material containing from 10 wt. % to 50 wt. % copper metal. The surfactant contains $C_8$ to $C_{14}$ carbon chain alcohols which have been ethyoxylated and propoxylated. A slurry is achieved just before entry into the flotation machine.

In this invention, dust emissions are controlled by the addition and maintenance of particle surface moisture. The glycerol (glycerin) component used in the invention is a non-volatile humectant which acts to attract atmospheric moisture, and very importantly, retain applied moisture, thereby maintaining residual surface moisture on the treated material. The specific surfactants used in the invention produce little to no foaming, enhance the wetting capability of the water carrier and provide a continued reduction in particle hydrophobicity. A further benefit is that the invention has been shown to have no detrimental effect on downstream copper ore processing via either froth flotation or solvent extraction. The dust control palliative used in the invention is dilutable, and environmentally benign. It can be shipped as a concentrate and diluted on site either as a continuous injection into dust control sprays or by bulk predilution with dust control spray water. It can be formulated so that there is no adverse effect on downstream material processing. The most preferred points of application of the dust control palliative are in the vicinity of bulk material movement and/or free fall, such as truck dump stations, conveyor belts and belt transfers, stacking-tubes, silos, etc.

The glycerol and surfactant dust palliative dispersion is added to normal process dust control water spray, either by direct injection or by bulk premix. Dilution rates may range from less than 100:1 to 1000:1, preferably 500:1 to 1000:1 weight/weight water to palliative. The diluted spray is directed in such a way as to atomize the material and to contact, as completely as practicable, all particles and dust in the bulk material being treated. Where possible, spray applications will be made at points of free fall in order to contact, wet, and aggregate airborne dust particles. Typical dosage rates of actual glycerol/surfactant dust palliative component are in the range of 0.02 to 0.005, kilograms per 1000 kilograms of ore.

These and other advantages and details of the invention will be more apparent upon review of the following drawings and detailed description.

BRIEF DESCRIPTION OF THE DRAWINGS

The invention will be more fully understood from the following drawings, in which.

DESCRIPTION OF THE PREFERRED EMBODIMENTS

Figure 1:
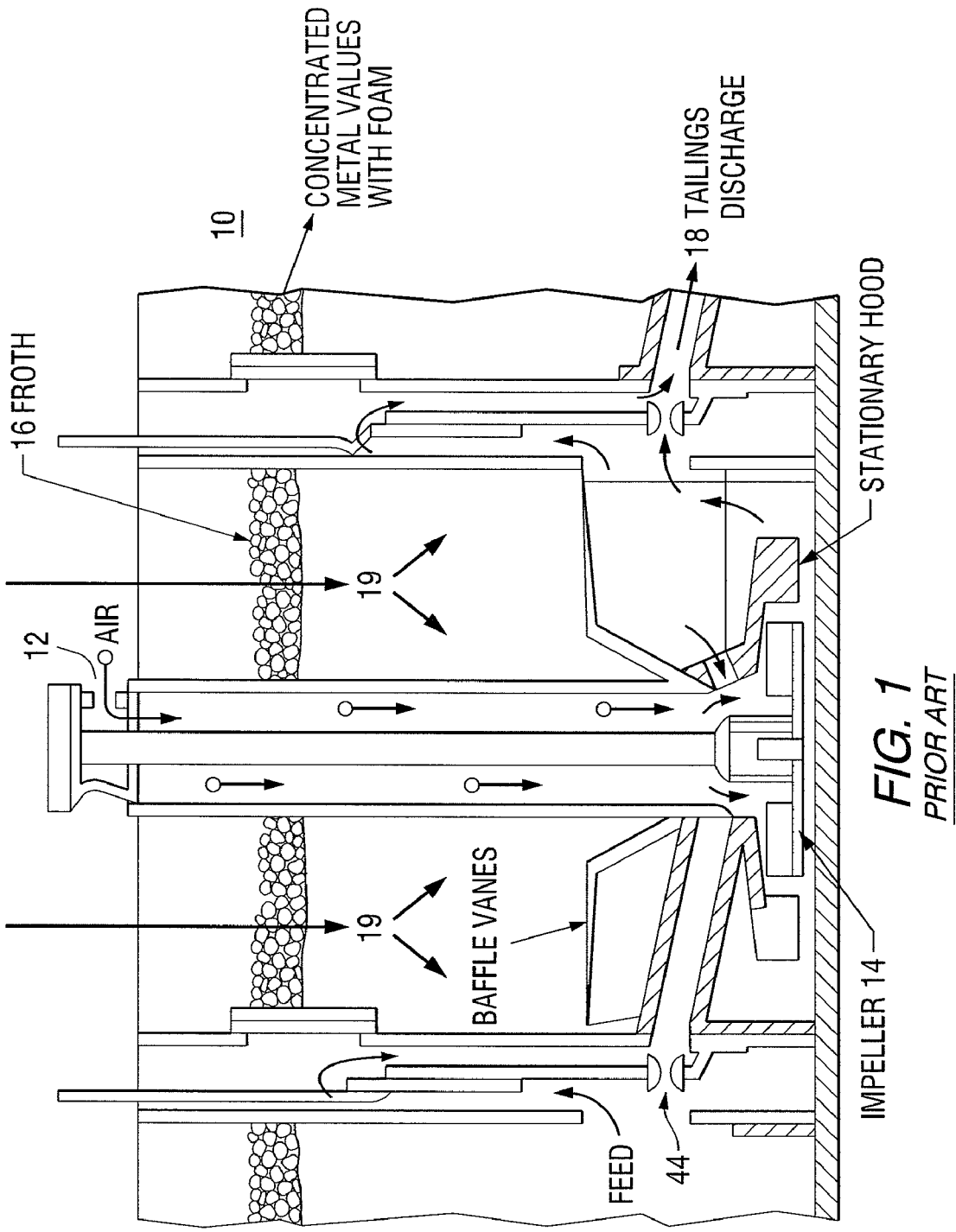
FIG. 1 is a cross-sectional view of one type of prior art metal value, concentrating flotation machine, cell or circuit, illustrated in the previously described Unit Operations Reference.
Figure 2:
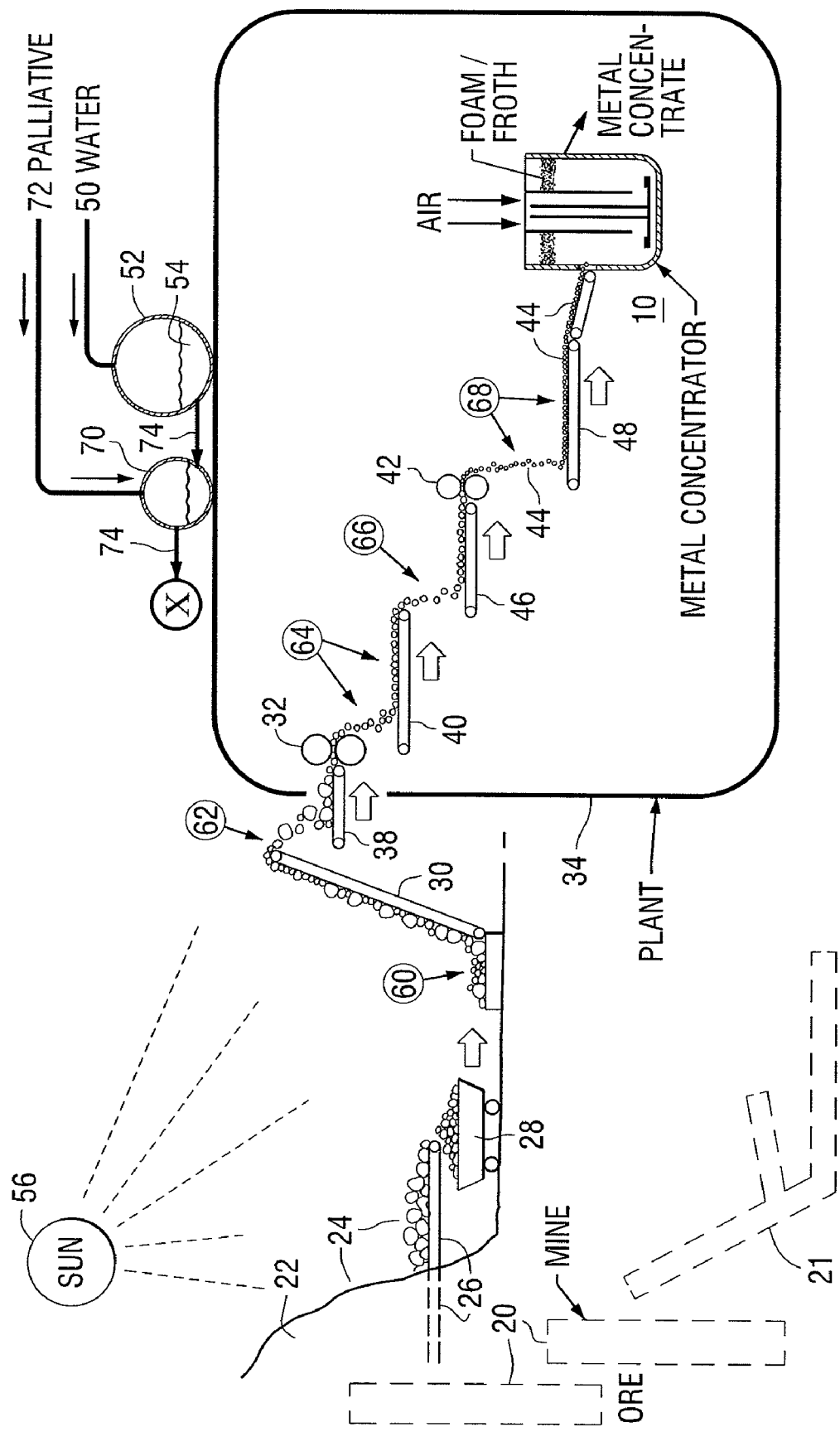
FIG. 2, which best illustrates the invention, is a schematic, generalized illustration of the steps involved in one embodiment of the method of the invention.

Referring now to FIG. 2, which generally illustrates one embodiment of the process of this invention; wherein the sulfide ore concentrator 10, which can be a flotation machine acting as a metal concentrating circuit, also shown in prior art FIG. 1, will be described in detail later. In FIG. 2 a vein of metal bearing material 20, such as copper sulfide ore which may contain other valuable metal values such as iron and molybdenum is mined within a rock formation 22 or from an open pit, which might be required by vein 21, by blasting, drilling, excavating or the like. The metal bearing material usually contains only between 0.25 wt. % and 5.0 wt. % copper, which is the main metal value this invention is concerned with. The average copper content is about 0.4 wt. % to about 1.0 wt. %, and, of course, at such low levels the copper content must be concentrated. A stream 24 of rock material comprising the metal bearing material is provided, for example, by mining transport 26, rail or haul truck transport 28, where it is further transported, usually via conveyor belt 30 to a one or more primary crushers 32. The initial rock size passing to conveyor belt 30 can range from about 2.54 cm. to 30.5 cm. (1" to 12"). The primary crusher 32 will usually reduce crushed rock 36 to a size of from about 2.54 cm to 15.25 cm (1" to 6").

The primary crusher 32 can be outside in the open or in an enclosure 34, such as an enclosed ventilated plant building or mill. Any dust generated in the enclosure 34 will create more problems to workers due to air pollution and more expense to avoid various OSHA and/or MSHA fines. Continuing with the method shown in FIG. 2, the primary crushed rock is further passed on, for example by a series of movers, such as conveyor belts 38 and 40 to one or more secondary crushers 42 to provide particle and dust material 44 containing metal values as metal bearing sulfide material, usually in the form of chalcopyrite ($CuFeS_2$) passing to one or more movers, such as conveyor belts 46 and 48 into one or more sulfide ore concentrators 10, one type of which is also shown no FIG. 1 and will be discussed later in detail.

The particle and dust material feed (for the metal concentrator 10) 44, is not easily wetted by water alone, having rough diameter sizes of from about 0.0044 cm to 0.25 cm. (0.0017" to 0.098"). Water input 50 to the system feeds to reservoir 52. Note the water level 54 is shown as low reflecting water supply/conservation problems in the U.S. American west. Also of note, in summer in Arizona, Utah etc., the sun 56 can generate outdoor temperatures of 35° C. to 49° C. (95° F. to 120° F.), providing very fast evaporation of water; however, in the enclosed plant building 34 temperatures can be maintained, reasonably between about 24° C. to 35° C. (75° F. to 95° F.). However, the less water wettable particle and dust 44, will be in agglomerate form (not yet a slurry) and will still be subject to relatively high evaporative temperatures.

Now referring to the inventive method of spraying the gross, rough, coarse crushed and fine crushed ore with a special aqueous mixture useful both outside and inside a warehouse or plant. The invention, generally described the previous discussion is a method of using a surfactant based palliative in a dilute water solution to control fugitive respirable dust during the overland conveying and subsequent crushing of copper bearing ore and while improving copper recovery in a copper sulfide flotation circuit. The surfactant based palliative is mixed with water and applied as a wet spray or foam onto the copper bearing ore during the conveying and crushing process in order to cost effectively prevent fugitive respirable dust from entering the atmosphere where the dust particles pose a threat to the respiratory system of workers, collect in and around critical processing equipment thereby forcing unscheduled and costly maintenance outages, and are lost to the atmosphere thereby possibly exceeding State and/or Federal air quality standards. When the surfactant based palliative is added to water, fugitive dust emissions are reduced, water consumption is reduced, and downstream equipment outages resulting from wet ore are reduced. Addition of the surfactant based palliative to the copper ore does not interfere with the copper sulfide flotation recovery process, and may improve copper recovery in the copper sulfide flotation process.

More particularly, the surfactant blend when used in conjunction with water as a carrier provides the following benefits to the copper mine:

1. Lower respirable dust levels around overland belts, transfer points, coarse copper ore stack out and reclaim piles, crushers, and storage bins.
2. Lower "opacity readings" and subsequent drop in airborne particulate matter around copper ore stack out areas.
3. Reduction in water consumption to effect acceptable dust control around overland belts, transfer points, coarse copper ore stack out and reclaim piles, crushers, and storage bins.
4. Reduce chute pluggage by regulation of moisture addition at the transfer stations and thereby lower maintenance costs and associated down time within the chutes.
5. The surfactant blend used for dust control will pass through the copper flotation process without interfering with the foam characteristics within the froth cell which determines recovery rate and grade of product recovered. It is thought that the surfactant blend applied as a dust control palliative to the copper ore persists on the copper sulfide ore until it reaches the froth flotation cells where the surfactant blend improves the rate of copper recovery.

6. When the surfactant blend is added to water for the purpose of process dust control, the surface tension of the water becomes lower. The lower surface tension allows intimate contact between the dust particles and the water surface, which results in the dust particles becoming wet and clinging to other, larger ore particles.

With regard to the surfactant based, dust control, aqueous, palliative utilized, instead of water, at all or a plurality of spray locations shown in FIG. 2 as 60, 62, 64, 66 and 68, especially at locations of free fall and settlement 62, 64 and 68, and most especially after secondary crusher 42 at location 68, where the particles are very small complicating water wetting; the following terms are defined below:

The term "palliative" herein means: serving to palliate, that is, here, a material that relieves or mitigates or alleviates dust introduction or passage into the atmosphere generally *The Random House College Dictionary*, Unabridged Edition, Revised, 1975.

The term "dust control palliative" herein means: the water plus mixture of glycerol and non-ionic surfactant, plus optional minor amounts of additives to be used to spray the ore rock metal bearing sulfide material, comprising rock, and dust particles.

The term "glycerol" herein means: (glycerin; glycyl alcohol) $C_3H_5(OH)_3$. The name glycerol is preferred over glycerin since the former indicates its alcohol structure. Properties: Clear, colorless, or pale yellow, odorless, syrupy liquid; sweet, warm taste; hygroscopic; sp. Gr. (anhydrous 1.2653, (U.S.P.XVI) greater than 1.249 (25/25° C.); (dynamite) 1.2620; m.p. 18° C., b.p. 290° C.; soluble in water and alcohol (aqueous solutions are neutral); insoluble in ether, benzene and chloroform. Flash point 177° C. Derivation: (a) From the spent lye liquor from the saponification of fats and oils in the soap industry, by precipitation of salt, albuminoids and metallic soaps of the higher fatty acids by iron persulfate (crude) or aluminum sulfate and concentration with subsequent steam distillation; (b) from propylene or allyl alcohol by chlorination, and hydrolysis; (c) from acrolein and hydrogen peroxide followed by reduction of the glyceraldehyde, or (d) from bio-diesel. Method of purification: Redistillation; ion exchange techniques. Grades: U.S.P.XVI; C.P. (for pharmaceutical and commercial purposes where highest grade of glycerol is required); saponification, soap lye, crude yellow distilled (for commercial purposes where color and extreme purity are not factors); high gravity or dynamite (dehydrated to 99.8-99.9% purity); natural; synthetic; etc. Containers: Drums; tank cars. Uses: Alkyd resins; explosives; ester gums; pharmacy; perfumery; plasticizer for regenerated cellulose; cosmetics; foodstuffs (preservative, sweetening); conditioning tobacco; liqueurs; solvent; printer's ink rolls; emulsifying agent; rubber stamp and copying inks; binder for cements and mixes; anti-freeze; paper coatings and finishes; special soaps; lubricant and softener; bacteriostat; penetrant; solvent; hydraulic fluid; humectant. Shipping regulations: None. "Note: Glycerol is a polydric alcohol and a polyhydroxyalkane."

The term "surfactant" herein means: Abbreviated term for surface active agent; for example "Surfactol", trademark for a series of castor oil-derived non-ionic surfactants including: "Surfactol" 13: A water dispersible grade of glyceryl monoricinoleate. Uses: Emulsifier; foam inhibitor; deflocculant for colored pigments in water-based pigment dispersions and latex emulsion paints. Alkoxy adducts of castor oil listed in the order of their increasing tolerance for water (from moderately self-emulsifiable to completely water soluble). Uses: Emulsifiers; defoamers; plasticizers; solubilizers for oils, dyes; lubricants; in emulsion paints, pigment dispersions, cosmetics and polishes".

Definitions of glycerol and surfactant above, are from *The Condensed Chemical Dictionary* 6th Edition, Rose and Turner, Reinhold Publishing Corporation 1966 (6th Ed.) "CCD".

The dust control palliatives of this invention, added to standard water sprays, possibly at locations 60, 62, 64, 66 and 68 and possibly elsewhere in FIG. 2 comprise:
(1) water
(2) glycerol
(3) non-ionic surfactant The non-ionic surfactant contains carbon chains of $C_8$ to $C_{14}$ length, that are both ethoxylated and propoxylated alcohols, most preferably containing 6 to 8 moles (ore) ethylene oxide $(CH_2)_2O$ and containing 11 to 13 moles ore propylene oxide (general formula) $OCH_2CHCH_3$ (see FIG. 3); with ethylene oxide "tails" capped/ended with propylene oxide sequences. These surfactants generally have viscosities of about 230 cps at 25° C. and about 45 cps. at 60° C., and have good chemical stability. They are biodegradable. These materials are, very importantly, "low foaming", even with prolonged agitation, and especially at about 25° C. have excellent wetting action.

The preferred ratio of water: mixture of glycerol and non-ionic surfactant is most preferably 500 to 1000 parts by weight water: 1.0 part by weight glycerol plus non-ionic surfactant mixture, while a broad range is 100 to 1000 parts by weight water: 1.0 part by weight glycerol plus non-ionic surfactant mixture. The ratio of glycerol: surfactant can range from 0.5 to 5.0 parts by weight glycerol:1.0 part by weight surfactant, preferably from 1.0 to 3.0 parts by weight glycerol:1.0 part by weight surfactant. Preferably dosage rates of, glycerol an non-ionic surfactant mixture (not taking into account the water component per 1000 kilograms of ore are 0.0043 liter to 0.0129 liter per 1000 kilograms of ore (rock material crushed=particles and dust material).

The addition of the water mixture of glycerol and non-ionic surfactant results in lower moisture in theory while maintaining effective dust control as confirmed by very low opacity numbers. The reduced surface moisture now contains surfactants which reduces surface tension thus allowing the ore to come into contact with metal surfaces of process equipment without sticking to those surfaces. The lower surface moisture combined with the lower surface tension on the ore allows the ore to pass through downstream process equipment (chutes, crushers, storage bins) with less ore sticking to the metal surfaces and plugging. Less plugging means higher production and fewer maintenance hours devoted to cleaning equipment (the plant has to be down while this cleaning takes place which is copper production time lost forever).

Returning again back to FIG. 2, reservoir 70 would hold the liquid dust control palliative 72, which would be mixed with water 74 from reservoir 52, which mixture 74 would feed most of spray locations X such as 60, 62, 64, 66 and 68. Also, FIG. 1 shows metal concentrator 10 with a mechanical agitation action where agglomerate feed 44 enters the metal concentrator as generally shown where it is mixed with air 12 by impellers 14 to form a froth 16 of small bubbles which overflows as concentrated metal values, usually into additional metal concentrators, while tailing 18 are discharged. As described previously flotation agents 19 are added to the concentrator to help free the metal values. Among those agents used today are frothing agents such as amyl alcohol, methyl amyl alcohol, 2-ethyl hexanol, polypropylene glycols/polyglycol esters, and less frequently pine oil, and cresylic acids and collecting agents such as sodium isopropyl xanthate, potassium amyl xanthate, potassium ethyl xanthate, sodium diethyl dithiophosphate, dialkyl dithiocarbamate, isopropyl thiocarbamate as well as other chemicals such as lime slurry or other pH modifiers.

Examples

In a four month period, experimental tests were conducted at a copper producer location using one offline unit—copper process utilizing a sulfide ore concentrator yielding both copper and molybdenum concentrates involving spraying ore crushed rock and powder or dust with the "dust control palliative" described above. The unit is generally shown in schematic, generalized form in FIG. 2.

In the example, bulk low grade copper/molybdenum sulfide ore was crushed using two primary gyratory crushers and transferred along two overland conveyor belts to secondary crushers housed in a crusher building, somewhat similar to the process shown in FIG. 2. The capacity of the sulfide ore concentrator, a flotation cell was about 700 to 900 tons ore per day. The facilities used for the experimental tests included an open pit mine, transporting in about 200 ton haul trucks, further transport via conveyor belt, spray wetting with the aqueous glycerol/surfactant dust pallative of this invention, crushing, grinding, flotation concentration, drying, thickening and storage.

The copper producer felt that a very slight increase in overall copper production per ton of ore was realized by the use of the "dust control palliative" used in the method of this invention. It is hard to see small increases, because daily copper recovery varies, but, if it is tracked for several or more months, it is possible to find even a 0.1% improvement. Even such a small improvement in copper recovery would mean millions of dollars in bottom line profit to a copper producer per year. Copper ore was made into a slurry in a concentrator in the experimental process, and the copper concentrate was separated via flotation in a flotation unit.

All previous attempts within the copper industry to add a dust control agent to water for the purpose of process dust control has resulted in a major disruption in the chemical process within the flotation unit. This disruption resulted in significantly lower copper recovery, which made the use of dust control products generally prohibited. It was difficult to convince copper producers to try this new process. The first and only chemical, known to applicants, to provide effective dust control while passing through the downstream flotation concentration copper recovery process with no deleterious effect on the process was used in this invention.

The "dust control palliative" used in this invention still uses water as the carrying agent. The "dust control palliative" helps the process through the change in the surface tension of water and the extension of the evaporation point. The product boasts the ability to reduce overall moisture additions below 0.5%, increased opacity scores, decreased plugged chutes and overall less operation and maintenance costs associated with controlling fugitive dust. Each spray system used in the experimental tests include a "dust control palliative" (herein after "PD-1"), and a chemical storage tank with a chemical mixing motor. The tank was a 5400-gallon X-link Polyethylene (PE) vertical tank with a secondary chemical tank X-link PE containment structure. The mixing device was a G&L, ¾ horsepower mixer that kept the PD-1 fully blended. The chemical: water mixture was applied at the transfer chutes through a spray bar system that was activated by a Ramsey Granuflow belt microwave sensor.

The spray systems combined a variety of both electrical and mechanical components.

Figure 3:
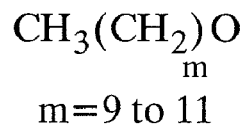
FIG. 3 is a general chemical formula, illustrating one embodiment of one of the preferred surfactants utilized in the dust control palliative used in this invention, where main chain repeating carbon m=9 to 11; ethylene oxide repeating units=6 to 8 and propylene oxide repeating units=11-13.
Figure 3:
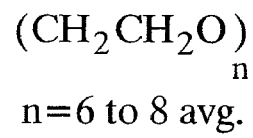
Figure 3:
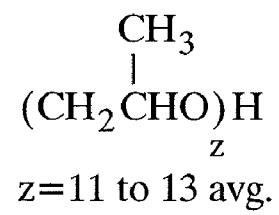

The PD-1 dust control palliative used in the above experimental tests was:

| Component | Parts by Weight | Notes |
| --- | --- | --- |
| Water | 240-500 | Regular available plant water |
| PD-1 | 1 | A combination of gylcerol and a specific non-ionic surfactant shown in FIG. 3 |
| Additives | | None |

The PD-1 used consisted essentially of 1 part by weight glycerol: 0.5 parts by weight of non-ionic alkoxylate surfactant which was an alcohol having $C_9$ to $C_{11}$ carbon chains that were ethoxylated and propoxylated. This surfactant was available under the Tradename "MAKON® NF-12, sold by Stepan Company of Northfield, Ill.; its formula is shown generally as FIG. 3, and it is described as a lauryl alcohol alkoxylate. MAKON® NF-12 is a pale straw liquid having a flash point>93.9° C., a viscosity at 25° C. of 230 cps and a pH of 9-10 at 5% aqueous. It is stable, not listed as carcinogenic according to IARC, NTP or OSHA and is biodegradable. It may contain 1,4-dioxene as a by-product which can pose problems with over-exposure. Solution of this material resist foam development even under extreme or prolonged agitation. A very similar and useful material is also sold as "ETHOX-37®" sold by Ethox Chemicals, LLC.

In the experimental tests the water+PD-1 mixture 500:1 by wt. was spray injected into the bulk copper/molybdenum ore rock, particles, dust fines as it fell from upper conveyor belts to lower conveyor belts (as at points 62, 64, 68 in FIG. 2), encapsulating the fine dust particles and leaving the area virtually dust free. This allowed reduction in water consumption, energy conservation, increased production, reduction of plugged equipment and an overall healthier work environment. Very importantly, it appears that the average water consumption (when used alone) dropped from 97 gallons per minute per belt to 57 gallons per minute per belt when used as described above with PD-1; a reduction of a remarkable and very surprising 41%. Assuming two belts operate an average of 20 hours per day and 350 days per year, the total water savings would be an astounding 33,600,000 gallons annually.

Generally, during the tests, the application spray rate was about 10 gal. per hour of PD-1 (taken alone) but actually 40 gal. per hour of PD-1 plus water, depending on the number of valves open in the production line. Naturally, in actual plant rather than laboratory tests values can vary a bit more. The water pressure at the dust control palliative spray locations averaged about 40 pounds per square inch (psi.).

Also there appears to have been a substantial reduction in plugged chutes associated with the conveyor belts associated with secondary crushers, resulting in reduction in downtime for repair from about 27 downtime hours before the test period to 8 downtime hours at the end of the test period.

A wide variety of other proprietary materials were tried as dust control agents to see if copper recovery was advanced after the concentrating circuit. One material Haulpro® seemed to equal PD-1, but it was a vastly more expensive material and would not seem to be remotely cost effective in copper recovery processes.

The present invention has been described above with reference to a number of exemplary embodiments and examples. It should be appreciated that the particular embodiments shown and described herein are illustrative of the invention and its best mode and are not intended to limit in any way the scope of the invention as set forth in the following claims.

What is claimed is:

1. A method of controlling respirable dust in recovering metal values from a metal bearing sulfide material comprising the steps:
   (1) providing a stream of rock material comprising the metal bearing sulfide material;
   (2) crushing the rock material at least once, to provide particle and dust material;
   (3) conveying the particle and dust material to a metal sulfide ore concentrator, including at least one device, capable of separating metal values from the particle and dust material; wherein during at least one of steps (1), (2) or (3) the material is contacted with a surfactant based dust control palliative comprising a water mixture of glycerol and non-ionic surfactant, which surfactant enhances the wetting ability of the water to the particle and dust on the material, wherein the ratio of water: surfactant based dust control palliative is from about 100 to 1000 parts by weight water:1 part by weight surfactant based dust control palliative and the ratio of glycerol: surfactant is from about 0.5 to 5.0 parts by weight glycerol:1 part by weight surfactant, to provide a wetted particle and dust material having reduced hydrophobicity; and then (4) passing the conveyed wetted particle and dust material through the metal sulfide ore concentrator of step (3) to provide concentrated metal values.

2. The method of claim 1, wherein the device capable of separating metal values is a flotation machine.

3. The method of claim 1, wherein the rock material is crushed in at least one initial crusher to reduce size to about 2.54 cm. to 15.25 cm. and then in at least one secondary crusher to reduce particle size to about 0.0044 cm. to 0.25 cm., and wherein the metal bearing sulfide material contains copper.

4. The method of claim 1, wherein surfactant based dust control palliative lowers the surface tension of water present allowing intimate contact between the particle and dust and the water resulting in wetting.

5. The method of claim 1, wherein the dosage rate of dust control palliative to rock material is from 0.02 to 0.005 kilograms per 1000 kilograms of rock material.

6. The method of claim 1, wherein the surfactant based dust control palliative is a water dispersion of glycerol and non-ionic surfactant containing $C_8$ to $C_{14}$ carbon chain alcohol which have been ethoxylated and propoxylated alcohols.

7. The method of claim 1, wherein the surfactant based dust control palliative has the chemical formula:

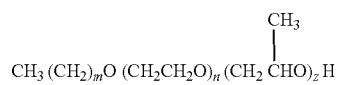

where m = 9 to 11; n = 6 to 8 ave and z = 11 to 13.

8. A method of controlling dust in recovering copper values from a metal bearing material comprising the steps:
   (1) providing a stream of rock material comprising a copper bearing material;
   (2) crushing the rock material at least once, to provide particle and dust material;
   (3) conveying the particle and dust material, in a conveying action having at least one point of free fall, to a copper sulfide ore concentrator, including at least one flotation machine, capable of separating copper values from the particle and dust material; wherein during at least one of steps (1), (2) or (3) the material is sprayed with a surfactant based dust control palliative comprising a water dispersion of glycerol and non-ionic surfactant containing C8 to C14 carbon chains with attached ethoxylated and propoxylated alcohols, which surfactant enhances the wetting ability of the water to the particle and dust material, to provide a wetted particle and dust material agglomerate; and then
   (4) passing the agglomerate through a flotation machine to provide a copper concentrate material containing from 10 wt. % to 50 wt. % copper metal.

9. The method of claim 8, wherein the rock material is crushed in at least one initial crusher to reduce size to about 2.54 cm. to 15.25 cm. and then in at least one secondary crusher to reduce particle size to about 0.0044 cm. to 0.25 cm., and wherein the metal bearing sulfide material contains copper.

10. The method of claim 8, wherein surfactant based dust control palliative lowers the surface tension of water present allowing intimate contact between the particle and dust and the water resulting in wetting allowing clinging to larger particles.

11. The method of claim 8, wherein the dosage rate of dust control palliative to rock material is from 0.02 to 0.005 kilograms per 1000 kilograms of rock material.

* * * * *

UNITED STATES PATENT AND TRADEMARK OFFICE
CERTIFICATE OF CORRECTION

PATENT NO.         : 7,998,244 B2
APPLICATION NO.    : 12/633821
DATED              : August 16, 2011
INVENTOR(S)        : Kevin D. Skiles et al.

It is certified that error appears in the above-identified patent and that said Letters Patent is hereby corrected as shown below:

On the title page, Abstract, line 4, "dust at least" should read --dust in at least--.
    Column 1, line 44, "floatation" should read --flotation--.
    Column 1, line 58, "Unit Operations of *Chemical Engineering*," should read --*Unit Operations of Chemical Engineering*,--.
    Column 3, line 37, "fins" should read --fine--.
    Column 3, line 42, "T is" should read --Tis--.
    Column 4, line 18, "proxylated Preferably," should read --proxylated. Preferably,--.
    Column 6, line 2, "shown no" should read --shown on--.
    Column 7, line 17, "atmosphere generally" should read --atmosphere – generally--.
    Column 8, line 3, "polishes"." should read --polishes.--.
    Column 8, line 35, "an non-ionic surfactant" should read --and non-ionic surfactant--.
    Column 12, line 9,
        "where $m = 9$ to $11$; $n = 6$ to $8$ ave and $z = 11$-$13$."
should read
        --where $m = 9$ to $11$; $n = 6$ to $8$ avg. and $z = 11$-$13$ avg.--

Signed and Sealed this
Third Day of April, 2012

David J. Kappos
*Director of the United States Patent and Trademark Office*